United States Patent [19]
Calvert

[11] 3,973,181
[45] Aug. 3, 1976

[54] HIGH FREQUENCY METHOD AND APPARATUS FOR ELECTRICAL INVESTIGATION OF SUBSURFACE EARTH FORMATIONS SURROUNDING A BOREHOLE CONTAINING AN ELECTRICALLY NON-CONDUCTIVE FLUID

[75] Inventor: Thomas J. Calvert, Norwalk, Conn.
[73] Assignee: Schlumberger Technology Corporation, New York, N.Y.
[22] Filed: Dec. 19, 1974
[21] Appl. No.: 534,561

[52] U.S. Cl. .................................... 324/5; 324/10
[51] Int. Cl.² ........................................ G01V 3/18
[58] Field of Search .................... 324/1, 5, 10, 57 Q

[56] References Cited
UNITED STATES PATENTS

| | | | |
|---|---|---|---|
| 2,018,080 | 10/1935 | Martienssen | 324/5 |
| 2,592,101 | 4/1952 | Aiken | 324/1 |
| 2,689,329 | 9/1954 | Zimmerman | 324/5 |
| 2,749,503 | 6/1956 | Doll | 324/10 X |
| 3,060,373 | 10/1962 | Doll | 324/10 X |
| 3,113,265 | 12/1963 | Woods et al. | 324/1 |
| 3,601,692 | 8/1971 | Schuster | 324/10 |
| 3,699,429 | 10/1972 | Ratz | 324/5 |
| 3,832,631 | 8/1974 | Koga et al. | 324/56 |
| R21,797 | 5/1941 | Jakosky | 324/1 |

FOREIGN PATENTS OR APPLICATIONS

1,088,824   10/1967   United Kingdom .................... 324/5

Primary Examiner—Gerard R. Strecker

[57] ABSTRACT

A method and apparatus for investigating earth formations traversed by the borehole containing an electrically nonconductive fluid in which a system of pad-mounted electrodes are arranged laterally around a well tool. A high frequency oscillator is coupled to the electrodes through a selectively variable capacitor. As the apparatus is passed through the borehole, the high frequency current produced by the oscillator capacitively couples the electrodes to the formation and provides a measure of the electrical conductivity or resistivity of the earth formation.

19 Claims, 6 Drawing Figures

HIGH FREQUENCY METHOD AND APPARATUS FOR ELECTRICAL INVESTIGATION OF SUBSURFACE EARTH FORMATIONS SURROUNDING A BOREHOLE CONTAINING AN ELECTRICALLY NON-CONDUCTIVE FLUID

The invention relates to methods and apparatus for investigating subsurface earth formations and in particular to methods and apparatus for measuring the electrical resistivity or conductivity of the earth formation adjacent to a borehole which has been drilled in to the earth's surface.

Commonly, the electrical resistivity or conductivity of subsurface earth formations is investigated by moving a system of electrodes, suspended at the end of a cable, through the borehole. Current emitted from one or more of these electrodes is caused to flow into the formation surrounding the borehole. By measuring the flow of current and/or the electrical potential at various points within the borehole, signals representative of the resistivity or conductivity of the formation surrounding the borehole are obtained. These signals are useful in determining the nature and lithological character of the various subsurface earth formations penetrated by the borehole. In particular, this information can be employed for determining the presence and depth of oil or gas bearing formations.

One of the requirements of this electrical logging method of investigating earth formations is the presence of a conductive fluid in the borehole to permit the passage of conductive current from the electrode system into the formation. In the past, boreholes were generally drilled using a conductive or "water-based" drilling mud which serves as the conductive medium for the electric current. However, recently there has been an increase in the number of boreholes which are drilled with a nonconductive fluid, for example, air or "oil-based" drilling mud. The high electrical resistance of this nonconductive fluid, which has little or no electrical conductivity, makes it difficult, if not impossible, to make resistivity measurements as previously described. This problem is further increased when an oil based drilling mud is employed, since a layer of the nonconductive drilling mud, called mudcake, is formed on the borehole wall during the drilling operation.

An early attempt to obtain resistivity measurements in formations containing nonconductive fluid is disclosed in U.S. Pat. No. 2,749,503 issued June 5, 1956 to Doll. According to this patent, a pad-mounted electrode system is lowered into the borehole. A high frequency signal is coupled into the formation, and both the capacitance and resistance of the formation are measured on an impedance bridge. This system would require that the bridge be manually balanced for each measurement. Therefore the use of this system would be time-consuming considering that a borehole could extend for thousands of feet into the earth's surface and measurements are usually taken at 6-inch to 2-foot depth intervals.

Another attempt to overcome this problem resulted in the development of induction logging. In these devices, a high frequency alternating magnetic field, created by a current flowing through a transmitter coil, induces secondary currents in the formation surrounding a borehole. These secondary currents induce circular ground loop paths coaxial with the transmitter coil which, in turn, create magnetic fields which induce signals in a receiver coil positioned in the device. These signals are known to be related to the conductivity of the formation. Since electrical conduction of currents is not required, the tool provides a relatively accurate measurement of conductivity or resistivity in formations containing either conductive or nonconductive fluids.

While induction logging devices have been utilized to overcome the difficulty of obtaining formation resistivity in boreholes having a nonconductive fluid, they do not provide a measure of the resistivity at various points around the circumference of the borehole at one particular depth level. These measurements are desirable in order to determine the dip angle and direction of the boundaries between contiguous formation strata having different resistivity or conductivity characteristics. To measure the dip angle and direction, commonly called a "dipmeter survey", a device, such as disclosed in U.S. Pat. No. 3,060,374 issued to Doll on Oct. 23, 1962, typically has three to four sets of pad-mounted electrodes circumferentially spaced around the periphery of a tool. These pads engage the borehole wall and provide simultaneous measurements of the resistivity of the earth formation at the corresponding circumferentially spaced apart locations around the borehole wall. The occurrence of different resistivities at different points around the circumference of the borehole at a single depth indicate that the formation at this depth is not perpendicularly intersected by the borehole. By correlating these measurements, the angle as well as the direction of dip of these formations can be ascertained.

These dipmeter survey devices, however, are also designed to operate in boreholes having conductive fluid. When these devices are used in boreholes containing a nonconductive fluid, it has been found that the resistivity measurements are not sufficiently accurate to provide proper correlation between the measurements at a particular depth level. Thus, the need clearly exists for an electrical well logging device for obtaining resistivity measurements in boreholes containing a nonconductive fluid, in particular, for the purpose of obtaining an accurate dipmeter survey.

Another approach to the problem of measuring formation parameters in boreholes having nonconductive fluid involves the use of a high frequency signal to capacitively couple an electrode system through the nonconductive fluid to the borehole wall. These techniques, as exemplified by patents to Jakosky, U.S. Pat. No. RE21,797 of Mar. 13, 1941; Aiken, U.S. Pat. No. 2,592,101 issued Apr. 8, 1952; and Zimmerman, U.S. Pat. No. 2,689,329 issued Sept. 14, 1954, have however been primarily concerned with measuring the dielectric constant of the formation.

A more recent patent issued to Ratz, U.S. Pat. No. 3,699,429 on Oct. 17, 1972 discloses a method for testing geological strata utilizing a high frequency oscillator to provide a signal which capacitively couples a signal radiator through an air gap to the geological strata under test. As the radiator is moved to various locations opposite the strata, a shift in the resonant frequency of the circuit comprising the oscillator, radiator and formation occurs. Resonance is restored by changing the air gap between the radiator and the strata. Comparison of the signals produced with known responses from known formations identifies the particular material in the strata adjacent the radiator.

In accordance with the present invention, a subsurface earth formation traversed by a borehole containing nonconductive fluid is investigated utilizing a pad-mounted electrode system haviing at least one current-emitting and one current-return electrode.

An oscillator coupled to the electrodes produces a signal at sufficiently high frequency to capacitively couple the electrode system to the formation. The phase difference between the current and voltage components of the oscillator signal are determined and the signal is adjusted until this phase difference is a predetermined amount. This current from the oscillator is measured to provide a signal indicative of the formation resistivity.

In one embodiment of the invention, a high-frequency oscillator, a measuring circuit and a matching network are coupled to the electrodes and together with the formation form an equivalent electrical circuit having resistance, capacitance and inductance. In operation, the equivalent electrical circuit is tuned to the oscillator frequency. With the equivalent circuit in resonance, the current from the oscillator is indicative of the resistivity of the formation surrounding the borehole.

As the electrode system moves through the borehole, the characteristics of the formation and the gap between the electrodes and the formation change, causing a change in the electrical characteristics of the equivalent electrical circuit, principally the capacitance coupling the electrode to the formation, and the resistivity of the formation. This change in formation characteristics changes the resonant frequency of the equivalent electrical circuit, and the measured oscillator current is no longer representative of the formation resistivity.

To return the resonant frequency of the equivalent electrical circuit to the frequency of the oscillator, the measuring circuit includes means for shifting the phase angle of the oscillator voltage by a predetermined amount, preferably 90°, and means for providing a signal indicative of the phase difference between the phase shifted voltage and the current of the oscillator signal. This signal, indicative of the phase difference, is coupled to the matching network to control the reactance of a variable reactance element, preferably a variable capacitance diode. The reactance of this element is automatically varied until the phase difference is returned to a predetermined valve indicating that the electrical equivalent circuit is retuned to the resonant frequency of the oscillator. The measured current is then representative of the formation resistivity. In one form of the invention, a plurality of pad-mounted electrodes are coupled to the formation to produce a dipmeter survey.

For a better understanding of the present invention, together with other and further objects thereof, reference is had to the following description taken in connection with the accompanying drawings, the scope of the invention being pointed out in the appended claims.

Figure 1:
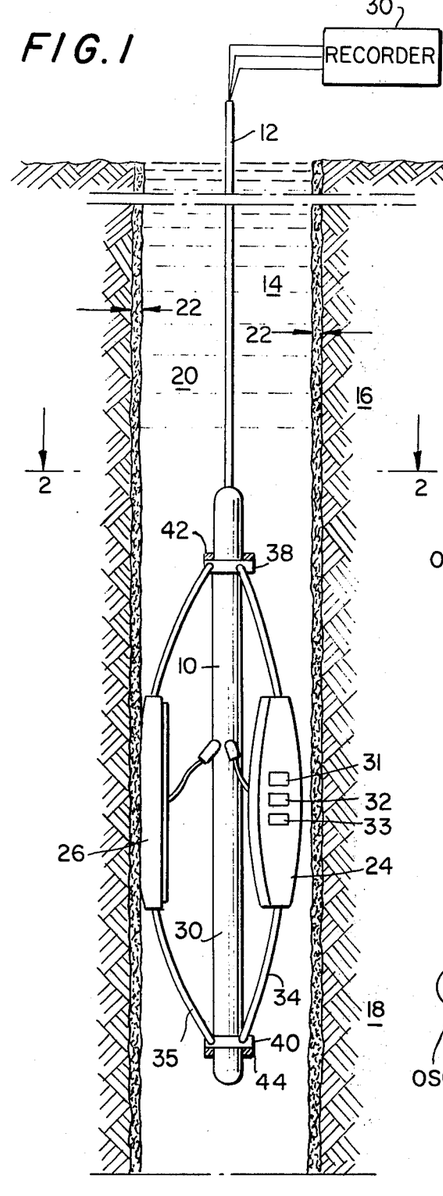
FIG. 1 is a schematic representation showing the well logging apparatus arranged in accordance with the principles of the present invention.

Turning now to FIG. 1, a logging tool 10 arranged in accordance with the principles of the present invention is depicted as it will appear while suspended by a typical logging cable 12 within a borehole 14 penetrating various earth formations such as 16 and 18. The borehole contains an electrically nonconductive fluid such as oil-base mud or air. When an oil base drilling mud is used during the drilling operation, the walls of the borehole typically are lined with a layer 22 of the mud, commonly called mudcake, which is deposited when the liquid phase of the drilling mud penetrates or invades the permeable formations, leaving behind solid material as a layer on the borehole wall. If the borehole is filled with a nonconductive fluid, such as air, layer 22 represents the separation between the formation and pad due to irregularities in the borehole wall.

Figure 2:
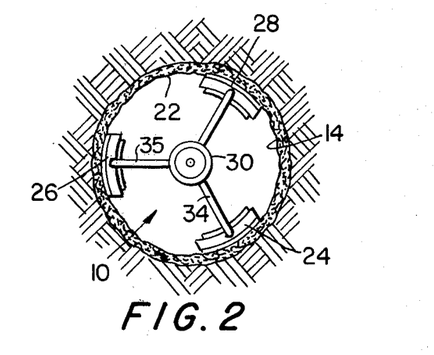
FIG. 2 is a cross-sectional view of the logging tool illustrated in FIG. 1 and taken along the lines 2—2 of FIG. 1.

The principles of the present invention are applicable for obtaining either a single electrical resistivity measurement or for obtaining a plurality of such measurements for determining the angle and direction of dip of the formations surrounding the borehole. The illustrative embodiment described provides a dipmeter survey. Referring to FIGS. 1 and 2, three electrically insulated wall-engaging pads 24, 26 and 28 are cooperatively arranged around the body of tool 30 at circumferentially spaced intervals. Spaced electrical contacts or electrodes such as 31, 32 and 33 are mounted on the outer face of each of the pad members.

The pads are mounted on the central portions of elongated, outwardly-bowed springs 34, 35 and 36 having their upper and lower ends secured to collars 38 and 40 which are slidably mounted around the upper and lower portions of the tool body between longitudinally-spaced shoulders 42 and 44. In this manner, as the logging tool is passed through the borehole the springs will act to maintain each of the pad members in contact with the adjacent surfaces of the borehole wall. As changes in the diameter of the borehole wall are encountered, the springs will flex as required to accommodate the passage of the tool.

As shown in FIG. 2, in the preferred arrangement of logging tool 10, the three pad members are mounted at angular intervals of 120° around the tool body. It will be appreciated that four equally spaced pad members could also be employed. Other mounting arrangements such as shown in U.S. Pat. No. 3,060,373, referenced above, can also be employed for circumferentially spacing the wall-engaging pads around the body of the tool.

Figure 3:
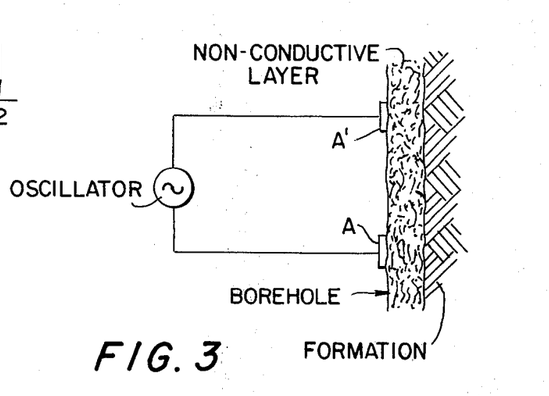
FIG. 3 is a simplified schematic diagram illustrating the principles of the present invention.
Figure 4:
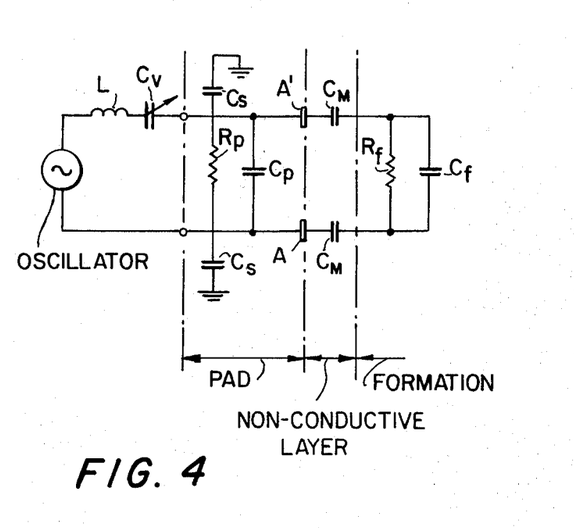
FIG. 4 is a schematic diagram showing the equivalent electrical circuit for the pad mounted electrode array of FIG. 3 for illustrating the principles of the present invention.

Referring now to FIG. 3, there is shown a simplified schematic diagram for purposes of illustrating the principles of operation of the invention. As shown, two electrodes, A and A' mounted on a pad, not shown for the sake of clarity, are suspended in a borehole and separated from the formation by a non-conductive layer, which, in the case of a borehole containing oil-based mud is the mudcake, and in the case of a borehole containing a fluid such as air would be the standoff from the formation caused, for example, by irregularities in the surface of the borehole wall. An oscillator is coupled between the electrodes A and A'. The equivalent electrical circuit is shown in FIG. 4. As shown, the pad can be considered as having a resistor, $R_p$, representing the pad dielectric losses and leakage, connected in parallel with a capacitor, $C_p$, representing the interelectrode capacitance, and two capacitors, $C_s$, representing stray capacitants to ground. The nonconductive layer can be represented as two capacitors, $C_m$, in series respectively with the electrodes A and A'. The formation can be represented by a resistor, $R_f$, in parallel with a capacitor, $C_f$. The entire inductance of the circuit is represented by inductor L. An additional variable capacitor, $C_v$, is shown between the pad and the oscillator. Its function will be described below.

From the equivalent circuit, it can be seen that if the frequency of the oscillator is sufficiently high, capacitor $C_m$ will capacitively couple the electrodes A and A' through the nonconductive layer and cause a complex displacement current to flow through the formation represented by $R_f$ and $C_f$. The real component of the current is dependent upon the magnitude of the resistors $R_p$ and $R_f$ and the imaginary component dependent upon the capacitors and inductor L. By arranging $R_p$ to be large compared to $R_f$, the real component of the current will be primarily related to the formation resistivity, $R_f$. The oscillator frequency is chosen so that the imaginary component of the current will depend primarily on the values of $C_m$, $C_v$, and L. Thus, by measuring the oscillator current and voltage, values for the resistive and reactive components of the circuit can be obtained. From FIG. 4 it is seen that by tuning the circuit to the frequency of the oscillator, the measured current will be indicative at the formation resistivity $R_f$. To this end, the capacitance of variable capacitor $C_v$ is varied until the equivalent RLC circuit is in resonance with the oscillator frequency. As the electrodes are passed through the borehole, the values of $C_m$ and $R_f$ are primarily affected. By continuously adjusting the capacitance of capacitor $C_v$ to compensate for changes in $C_m$, the equivalent electrical circuit remains in resonance at the oscillator frequency and the measured current is indicative of the value of $R_f$.

Figure 5:
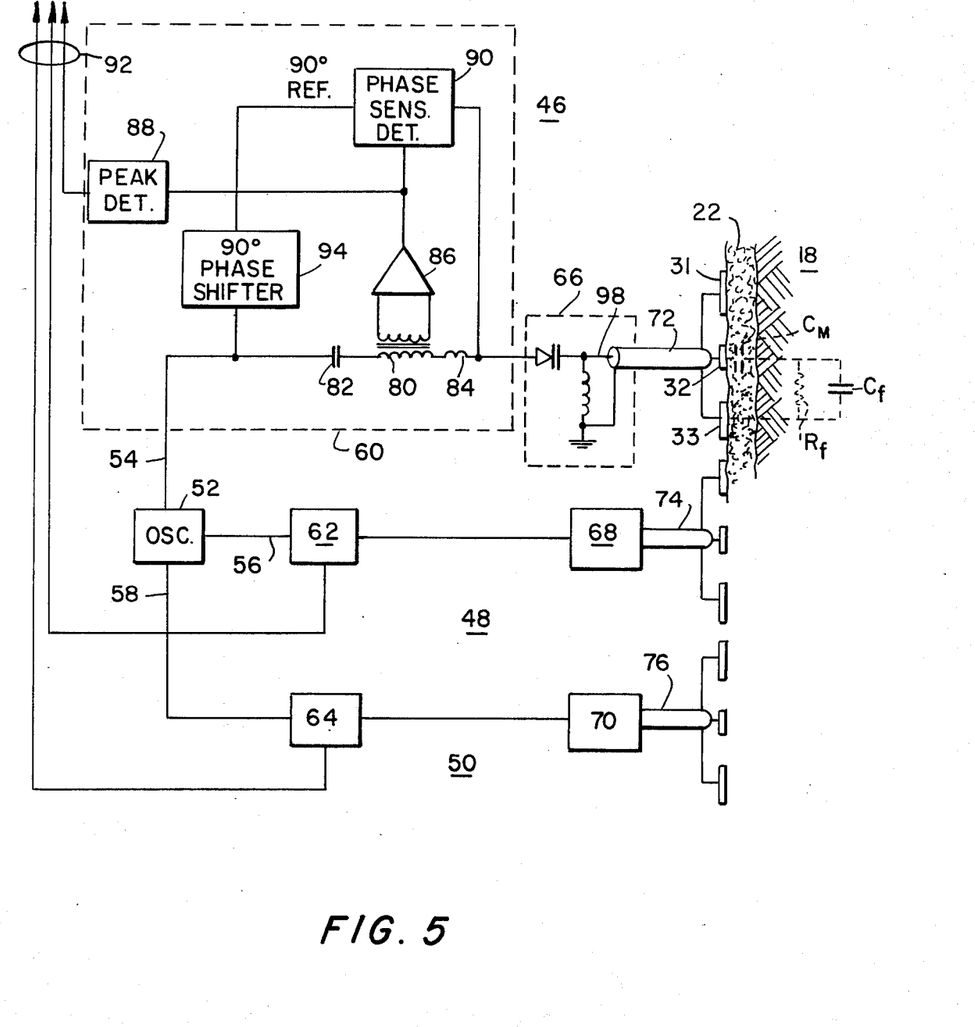
FIG. 5 is a schematic representation of a preferred circuit arrangement for the tool shown in FIG. 1.

Turning now to FIG. 5, there are shown actual circuits for determining the resistivity of formations surrounding a borehole containing nonconductive fluid in accordance with the principles described. As shown, a high frequency oscillator 52 having its input coupled by conductors 54, 56 and 58 to simultaneously drive three individual and preferably identical signal channels, associated respectively with the pads as illustrated in FIG. 1. The signal channels include measuring circuits 60, 62 and 64 which are respectively coupled by matching network 66, 68 and 70 and coaxial cables 72, 74 and 76 to the electrodes of the pads. Since the three circuits are identical, only one is shown and described in detail.

Oscillator 52 is an oscillator of conventional design, preferably having a resonant frequency in the range between 1 and 20 megahertz. Particularly suitable is a frequency of 7 megahertz. As illustrated, each measuring circuit comprises a current measuring transformer 80, the primary of which is serially connected between coupling capacitor 82 and inductor 84. The other terminal of coupling capacitor 82 is coupled to the output of the oscillator. The secondary winding of the current measuring transformer is coupled to the input of an amplifier 86 which has its output coupled respectively to the inputs of peak detector 88 and phase sensitive detector 90. The output of the peak detector is connected to one of the conductors 92 of cable 12 for conveying the output signal from the peak detector to the surface of the earth. As will be explained below, this signal is representative of the resistivity of the earth formation adjacent to the pad. The measuring circuit also comprises a 90° phase shifter 94 having an input coupled to the output of the oscillator and an output coupled to the input of phase sensitive detector 90 to provide a reference input therefor.

The output from the phase sensitive detector 90 and inductor 84 is coupled to the input of matching network 66. The matching network comprises a voltage control variable capacitance diode 96 (hereinafter referred to as a "Vericap") or similar variable capacitance device whose input is coupled to one enf of the central conductor 98 and the coaxial cable 72, the other end of which is coupled to the central electrode of the electrode array. As shown, an inductor 100 is connected between the central conductor and the outer sheath of the coaxial cable, which is connected to ground, to balance the capacitance of the cable. The other electrodes in the array are also connected to the ground near the outer sheath of the cable.

In operation, the oscillator produces an output signal sufficiently high in frequency to cause current to flow between the central electrode and the outer electrodes of the electrode array. This current is directly related to the load impedance which is seen by the oscillator. As described above, by proper selection of the oscillator frequency, the capacitive component of the load impedance can be effectively limited to only the capacitance, $C_m$, of the layer separating the electrodes from formation. For convenience, the remainder of the description will refer to this layer as the mudcake. By choosing a silastic type insulating material for the pad on which the electrodes are mounted, the pad resistance can be made sufficiently high so that the resistive components in the circuit are primarily the formation resistivity. With this arrangement, variations in the load impedance and the output current of the oscillator will be due to changes in the circuit capacitance, primarily the mudcake capacitance, $C_m$, or the formation resistivity, $R_f$. By arranging the Vericap to balance the changes in the circuit capacitance, any current changes will be due solely to changes in the formation resistivity and a measure of the current in the measuring circuit will therefore be a measure of the formation resistivity.

Accordingly, in the preferred embodiment of the invention, the Vericap is chosen to vary over a selected range of capacitance to maintain the series connection of the Vericap and the mudcake capacitance constant and the reactive components at the load impedance tuned to the frequency of the oscillator. Stated another way, it will be seen that the inductor forms a tuned series, parallel circuit with the Vericap and the mudcake capacitance. Thus, by selectively adjusting the capacitance of the Vericap as the mudcake capacitance varies, the capacitance of the Vericap will selectively control the total LC of the tuned circuit. Those skilled in the art will appreciate that as long as this LC circuit is maintained at resonance, the inductive reactance of the conductor will be equal and opposite to the magnitude of the total capacitor reactance of the circuit and the output voltage and current of the oscillator will be phased with the output current related to the formation resistivity, $R_f$. On the other hand, if there is a change in the capacitive reactance of the mudcake, the LC circuit will be detuned and produce a corresponding change in the phase relationship of the output current and voltage of the oscillator, in which case the capacitance of the Vericap is changed to retune the circuit.

To selectively control the capacitance of the Vericap to maintain the circuit in resonance at the oscillator frequency, the measuring circuit includes a phase shift network 94 which shifts the phase of the oscillator voltage by 90°. This phase shifted signal is coupled to the input of phase sensitive detector 90. The other input to the phase sensitive detector is derived through transformer 80 and amplifier 86 and is proportional to the current flowing in the transformer. At the resonant condition, the phase difference between the input signals to the phase sensitive detector is approximately 90°. Accordingly, so long as the reactive components are tuned to the frequency of the oscillator, the total current flowing through the measuring transformer will be attributable to the value of the resistance, $R_f$, of the earth formation and the amplitude of this signal will be directly related to the magnitude of this resistance. The current flowing through transformer 80 is amplified by amplifier 86 and coupled to peak detector 88. The output of the peak detector is coupled to conductor 92 which transmits this signal indicative of the formation resistivity to the surface of the earth.

On the other hand, should the reactance of the LC circuit change, such as will occur when the character of the formation and mudcake adjacent the pad varies, so as to provide a corresponding change in the value of $C_m$, the oscillator output current flowing through the measuring transformer will be proportionally out of phase with the output voltage of the oscillator. This change will produce a signal from the phase sensitive detector proportional to the magnitude of the difference between the input signals to the detector, which is coupled to the input of the variable capacitance diode and varies the capacitance thereof until the voltage and current output from the oscillator are again in phase indicating that the LC circuit is in resonance at the oscillator frequency.

To employ the new and improved tool 10 for providing a dipmeter survey, the tool is lowered into the borehole 14 as illustrated in FIG. 1. Thereafter, once the tool 10 is at a desired depth in the borehole, the cable 12 is raised or lowered as required for traversing the tool past those earth formations which are to be investigated. In the typical situation, it is, of course, preferred to initally position the tool 10 at a selected depth below the earth formation of interest so that the logging operation will be conducted by moving the tool upwardly through the borehole 14 with the cable 12 in tension.

As the tool 10 is traversed through the borehole 12, the wall-engaging pads 24, 26 and 28 will be respectively engaged with circumferentially spaced intervals of the borehole wall for obtaining individual resistivity or conductivity measurements of the adjacent portions of the earth formations for correlation at the surface. As previously explained, each of the signal channels 46, 48 and 50 will cooperatively maintain their respective LC circuits in resonance irrespective of the character of the formation immediately adjacent to each of the pad members 24, 26 and 28. Thus, as the electrodes such as 31, 33 pass along the wall of the borehole the load impedance of the oscillator 52 will remain purely resistive so that variations in the oscillator current passing through the transformer 80 will produce signals from the peak detector 88 which are representative of only the electrical conductivity or resistivity, $R_f$, of the earth formations being investigated.

Where the tool 10 is being employed as a dipmeter, correlation of the three measurements obtained at the surface will indicate whether the respective electrodes on the pads 24, 26 and 28 are electrically coupled to substantially the same earth formation at each increment of depth. Thus, similar or identical output signals from the signal channels 46, 48 and 50 will indicate that the tool 10 is investigating the same or a very similar formation. On the other hand, it will be appreciated that as the tool 10 passes the boundary between contiguous earth formations having detectable difference in their resistivity characteristics, unless the formations are perpendicularly intersected by the borehole 14 at least one of the pad members 24, 26 or 28 will cross the boundary between these two earth formations before the other one or two pad members. Accordingly, as the first of these pad members crosses the boundary of such contiguous non-perpendicular formations, the differing resistivity measurements which are then provided by the surface equipment 30 will be indicative of such a boundary crossing. By correlating the depths at which each of the several pad members cross these formation boundaries, the actual inclinations as well as the directions of the formation boundaries can be readily determined. As previously mentioned, the techniques typically employed for making such determinations are well known and a description of these techniques is not necessary for a full understanding of the present invention.

Should the new and improved tool 10 enter an interval of the borehole 12 in which the character of the layer between the pad and the borehole wall changes, the electrical capacity of that layer will correspondingly vary so as to detune the LC circuit in each of the three measuring circuits 60, 62 and 64. As previously discussed, detuning of any one of the LC circuits will produce a differential between the inductive reactance and the capactive reactance of the affected tuned LC circuit. Thus, as any unbalance is developed, the associated phase-sensitive detector will produce a corresponding output signal which adjusts the capacitance of the Vericap in its associated matching circuit for maintaining the overall caapacitance of the tuned circuit at a constant value. Thus, the overall reactive components of the circuit will be retuned to the frequency of the oscillator and the output current flowing through the three measuring circuits will each be dependent upon the resistivity, $R_f$.

Figure 6:
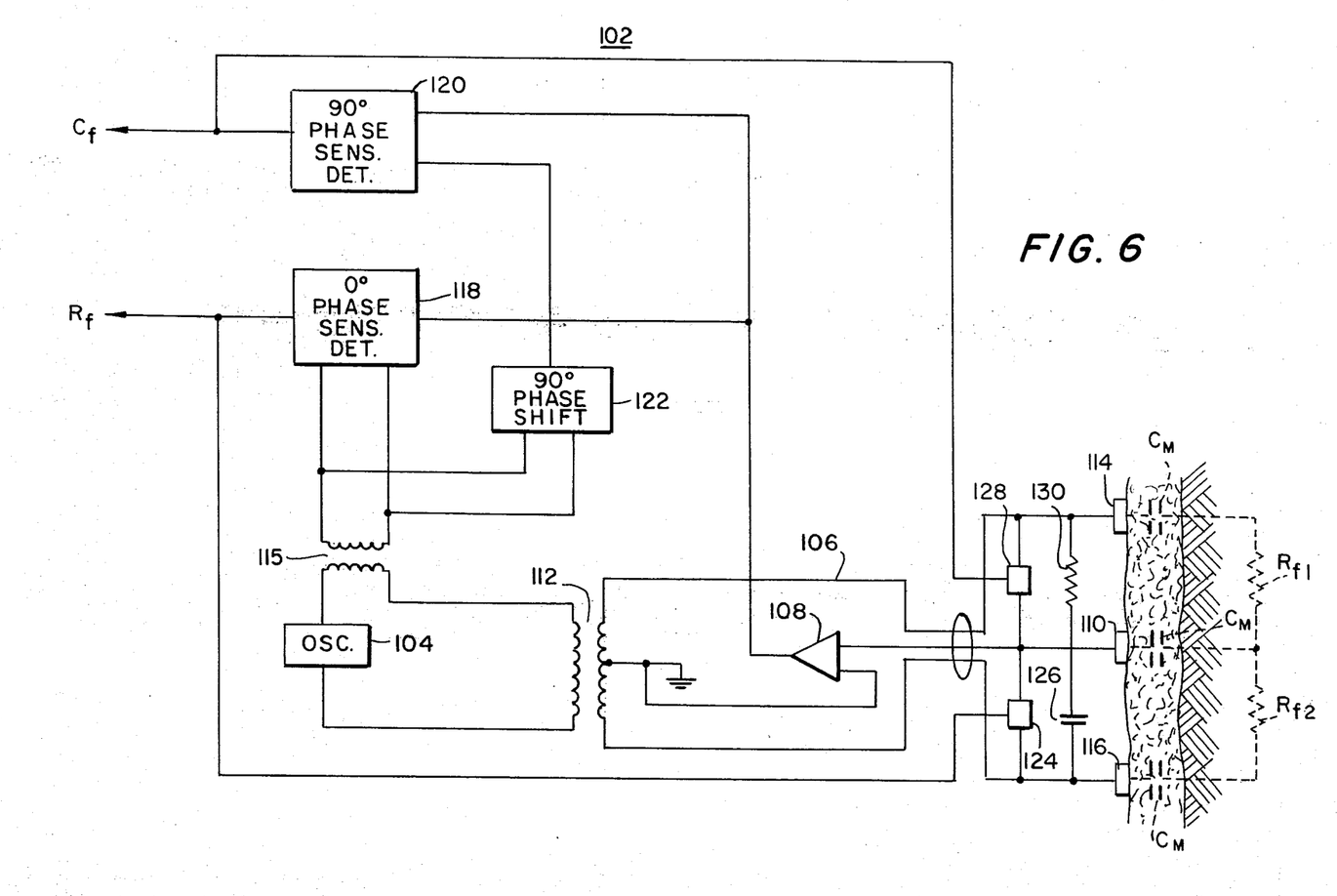
FIG. 6 is a schematic representation of an alternate circuit arrangement which incorporates the features and principles of the present invention.

Turning now to FIG. 6, an alternate embodiment is depicted of a new and improved logging tool which incorporates principles of the present invention. To illustrate the invention, only one signal channel 102 is illustrated, but it will be appreciated, of course, that three or four such signal channels can be employed, in a manner similar to that described, to provide a dipmeter survey. As illustrated, the signal channel 102 includes an oscillator 104 coupled to a differential-type balanced bridge circuit 106 which includes a differential amplifier 108 having one input terminal coupled to the central electrode 110 of the pad-mounted electrodes, and the other input terminal coupled to a grounded center tap of the secondary winding of transformer 112. Outer electrodes 114 and 116 are coupled across the outer terminals of transformer 112. The primary winding of the transformer is coupled to oscillator 104 through the primary winding of transformer 115.

The balance bridge effectively measures the differences between the formation resistivity, $R_{f1}$, measured between first and second electrodes 114 and 110, and the formation resistivity, $R_{f2}$, measured between the second electrode 110 and a third electrode 116. The three electrodes 108, 114 and 116 are capacitively coupled through the mudcake (as schematically represented by the dashed capacitor $C_m$) by the high frequency signal from the oscillator and as long as the resistivity, $R_{f1}$, is equal to the resistivity $R_{f2}$, a zero or null signal will be produced by differential amplifier 108.

Should $R_{f1}$ be measurably different from $R_{f2}$, as will be the case when the central electrode is at a boundary between two different types of formations, there will be an unbalance in the current flowing through the two halves of the secondary winding of transformer 112, thereby producing a corresponding output signal from the differential amplifier. The output signal from the differential amplifier is coupled to two phase-sensitive detectors 118 and 120. The other input to phase-sensitive detector 118 is coupled directly from oscillator 104 and phase-sensitive detector 118 operates as a zero degree phase-sensitive detector to provide a signal representative of the resistivity of the formation. The output of the oscillator is also coupled, via 90° phase shift network 122, to phase-sensitive detector 120 which acts as 90° phase sensitive detector to provide a signal representative of the capacitance of the formation.

The output from phase-sensitive detector 118 is also fed back to the pad, to vary the resistance of a variable resistive element 124, such as a field effect transistor, which is shown as preferably being coupled between electrodes 110 and 116 in parallel with fixed capacitor 126. Similarly, the output from phase-sensitive detector 120 is fed back to control the capacitance of variable capacitance diode 128 coupled between electrodes 110 and 114 in parallel with resistor 130. It will be understood that the output from the phase-sensitive detectors vary the capacitance and resistance in a manner to rebalance the bridge network so that the output from differential amplifier 108 is reduced to zero. In the balanced condition, the output from phase-sensitive detector 118 is representative of the resistivity of the formation and the output from phase-sensitive detector 120 is representative of the capacitance of the formation. These signals are transmitted to the surface of the earth where they are recorded in the usual manner and when correlated with the other signals from the other pads mounted on the tool, provide a measure of the dip of the formation. It will be understood, that both the variable capacitance and variable resistance can take many different forms and could be placed in the tool housing rather than at the pad since their primary purpose is to rebalance the bridge network by balancing the components of the formation.

While there have been described what are at present considered to be the preferred embodiments of this invention, it will be obvious to those skilled in the art that various changes and modifications may be made therein without departing from the invention and it is, therefore, intended to cover all such changes and modifications as fall within the true spirit and scope of the invention.

What I claim is:
1. A method for investigating subsurface earth formations traversed by a borehole containing an electrically non-conductive fluid comprising:
   passing a pad-mounted electrode system through the borehole, said electrode system having at least one current emitting electrode and at least one current return electrode;
   producing a high frequency electrical signal;
   coupling said high frequency electrical signal to said electrodes, the frequency of said high frequency signal being sufficiently high to couple said electrode to said formation to permit current to be emitted into the formation surrounding the borehole;
   comparing the resistive and reactive components of the high frequency signal to produce a first signal dependent upon the phase difference between the resistive and reactive component;
   using said first signal to automatically compensate for changes in at least the reactive component of said high frequency electrical signal; and
   measuring at least one component of said high frequency electrical signal to produce an output signal indicative of the resistivity of said earth formation.
2. The method of claim 1 wherein said step of using said first signal to compensate for changes in at least the reactive component of said electrical signal includes the steps of providing a variable reactance element coupled to said electrodes and applying said first signal to the variable reactance element to vary the reactance thereof to compensate for at least the reactive component of said electrical signal.
3. A method for investigating subsurface earth formations traversed by a borehole containing an electrically non-conductive fluid, comprising:
   passing a pad mounted electrode system through said borehole said electrode system having at least two current emitting electrodes and at least one current return electrode;
   coupling a high frequency electrical source to said current emitting electrodes, the frequency of said source being sufficiently high to couple said electrodes to said formation to permit current to be emitted into formation surrounding the borehole;
   producing a first signal indicative of at least the difference in formation resistivities between said current emitting electrodes and the current return electrode;
   utilizing said first signal to vary the impedance of a variable impedance element coupled to at least one of the current emitting electrodes to at least partially compensate for the electrical impedance of the formation through which current flows;
   producing an output signal related to said first signal indicative of the change in at least the formation resistivities between the current emitting electrodes and the current return electrodes.
4. A method for investigating subsurface earth formations traversed by a borehole containing an electrically non-conductive fluid comprising;
   passing a pad mounted electrode through the boreholes said electrode system having at least one current emitting electrode and at least one current return electrode;
   providing a high frequency electrical signal for coupling to said at least one current emitting electrode, the frequency of said high frequency signal being sufficiently high to couple said electrode to said formation to permit current to be emitted into the formation surrounding the borehole;

providing a means for coupling said high frequency electrical signal to said at least one current emitting electrode including at least one variable reactance element;

producing a first signal dependent upon the resistive and reactive components of said high frequency electrical signals;

varying the reactance of said variable reactance element in response to said first signal to compensate for changes in the reactive component of said high frequency signal; and producing an output signal indicative of the resistivity of the earth formation surrounding the borehole from a measurement of at least one component of said high frequency electrical signal.

5. The method of claim 4 further including the step of shifting the relative phase of the voltage and current components of said high frequency signal a predetermined amount prior to comparing the phase of said current and voltage components.

6. An apparatus for investigating subsurface earth formations traversed by a borehole, said borehole containing a substantially non-conductive fluid comprising:

a plurality of electrodes including at least one current emitting electrode and one current return electrode adapted to be moved through the borehole formed in the subsurface earth formation;

means for producing a high frequency electrical signal;

means for coupling said high frequency electrical signal to said electrodes, the frequency of said high frequency electrical signal being sufficiently high to couple into said formation to permit current to be emitted into the formation surrounding the borehole including means for comparing the resistive and reactive components of said high frequency electrical signal to produce an error signal and means responsive to said error signal for automatically compensating for variations in the reactive component of said electrical signal; and means for measuring at least one component of said high frequency electrical signal to produce an output signal indicative of the resistivity of the sub-surface earth formation.

7. The apparatus of claim 6 wherein said comparing means includes means for shifting the phase of one component of said high frequency signal by a predetermined amount and means for determining the phase difference between the components of said high frequency signal, said error signal being related to said phase difference.

8. The apparatus of claim 7 wherein said means responsive to said error signal is a variable reactance element.

9. The apparatus of claim 8 wherein said coupling means further includes impedance means having a fixed impedance to compensate for the reactive impedance of the coupling means.

10. An apparatus for investigating subsurface earth formations traversed by a borehole, said borehole containing an electrically non-conductive fluid, comprising:

a pad mounted electrode system including a plurality of electrodes having at least one current emitting electrode and one current return electrode adapted to be moved through a borehole formed in the subsurface earth formation;

means for producing a measurement indicative of the resistivity of the formation surrounding the borehole including electrical excitation means for producing a high frequency electrical signal, means for coupling said electrical signal to said electrodes including means responsive to the voltage component of said high frequency signal for producing a phase shifted voltage component signal, means for producing a current component signal of said high frequency signal, means for comparing said current component signal and said phase shifted voltage component signal to produce an error signal dependent upon the phase difference between said signals, variable impedance means coupled to said electrodes and responsive to said error signal for compensating said measurement means for changes in the reactive components of said high frequency signal, and means for measuring at least one of the current and voltage signals to produce an output signal indicative of the resistivity of the earth formation.

11. An apparatus for determining the dip of a subsurface earth formation traversed by a borehole containing an electrically non-conductive fluid comprising:

a pad mounted electrode system including a plurality of pad mounted electrodes adapted to engage a plurality of points around the borehole wall at each depth level as the apparatus traverses the borehole each of said electrode systems having at least one current emitting electrode and one current return electrode adapted to be moved through a borehole formed in the subsurface earth formation;

means for producing a measurement indicative of a resistivity of the formation at the various points around the borehole wall engaged by said electrodes including electrical excitation means for producing a high frequency electrical signal, means for coupling said electrical signal to each of said electrode systems including means responsive to the voltage component of said high frequency signal for producing a phase shifted voltage component signal, means for producing a current component signal of said high frequency signal means for comparing said current component signal and said phase shifted voltage component signal to produce an error signal dependent upon the phase difference between said signals, variable impedance means coupled to said electrodes and responsive to said error signal for compensating said measurement means for changes in the reactive components of said high frequency signal, and means for measuring one of the current and voltage signals to produce an output signal indicative of the resistivity of the earth formation at the various points around the borehole wall for comparison in determining the dip of the subsurface earth formation at a depth level under investigation.

12. An apparatus investigating subsurface earth formations traversed by a borehole containing an electrically non-conductive fluid comprising:

a pad mounted electrode system adapted to be passed through the borehole, said electrode system having at least one current emitting electrode and at least one current return electrode;

a high frequency electrical signal;

means for coupling said high frequency electrical signal to said electrodes, the frequency of said high frequency signal being sufficiently high to couple said electrode to said formation to permit current to be emitted into the formation surrounding the borehole;

means for comparing the resistive and reactive components of the high frequency signal to produce a first signal dependent upon the phase difference between the resistive and reactive components;

means for using said first signal to automatically compensate for changes in at least the reactive component of said high frequency electrical signal; and means for measuring at least one component of said high frequency electrical signal to produce an output signal indicative of the resistivity of said earth formation.

13. The apparatus of claim 12 wherein said means for using said first signal to compensate for changes in at least the reactive component of said electrical signal includes means for providing a variable reactance element coupled to said electrodes and means applying said first signal to the variable reactance element to vary the reactance thereof to compensate for at least the reactive component of said electrical signal.

14. An apparatus for investigating subsurface earth formations traversed by a borehole containing an electrically non-conductive fluid, comprising:

a pad mounted electrode system adapted to be passed through said borehole, said electrode system having at least two current emitting electrodes and at least one current returning electrode;

means for coupling a high frequency electrical source to said current emitting electrodes, the frequency of said source being sufficiently high to couple said electrodes to said formation to permit current to be emitted into formation surrounding the borehole;

means for producing a first signal indicative of at least the difference in formation resistivity between said current emitting electrodes;

means for utilizing said first signal to vary the resistance of a variable resistance element coupled to at least one of the current emitting electrodes to at least partially compensate for the electrical impedance of the formation through which current flows;

means for producing an output signal related to said first signal indicative of the change in at least the formation resistivity between the current emitting electrodes.

15. An apparatus for investigating subsurface earth formations traversed by a borehole containing an electrically non-conductive fluid comprising:

a pad mounted electrode system adapted to be passed through the borehole, said electrode system having at least one current emitting electrode and at least one current return electrode;

means for providing a high frequency electrical signal for coupling to said at least one current emitting electrode, the frequency of said high frequency signal being sufficiently high to couple said electrode to said formation to permit current to be emitted into the formation surrounding the borehole;

means for coupling said high frequency electrical signal to said at least one current emitting electrode including at least one variable reactance element;

means for producing a first signal dependent upon the resistive and reactive components of said high frequency electrical signals;

means for varying the reactance of said variable reactance element in response to said first signal to compensate for changes in the reactive component of said high frequency signal; and means for producing an output signal indicative of the resistivity of the earth formation surrounding the borehole from a measurement of at least one component of said high frequency electrical signal.

16. The apparatus of claim 15 wherein the means for producing said first signal includes means for separating said high frequency signal into voltage and current components, and means for comparing said current and voltage components to produce said first signal dependent upon the phase difference between the voltage and current components of said high frequency signal.

17. The apparatus of claim 16 further including means for shifting the relative phase of the voltage and current components of said high frequency signal a predetermined amount prior to comparing the phase of said current and voltage components.

18. A method for investigating subsurface earth formations traversed by a borehole containing an electrically non-conductive fluid comprising:

passing a pad mounted electrode system through the borehole, said electrode system having at least one current emitting electrode and at least one current return electrode;

providing a high frequency electrical signal for coupling to said at least one current emitting electrode, the frequency of said high frequency signal being sufficiently high to couple said electrode to said formation to permit current to be emitted into the formation surrounding the borehole;

providing a means for coupling said high frequency electrical signal to said at least one current emitting electrode including at least one variable impedance element;

producing a first signal dependent upon at least one characteristic of said subsurface earth formation;

varying the impedance of said variable impedance element in response to said first signal to compensate for changes in said at least one characteristic of said subsurface earth formation; and producing an output signal indicative of the resistivity of the earth formation surrounding the borehole from a measurement of said high frequency electrical signal.

19. An apparatus for performing a dip-meter survey of a subsurface earth formation traversed by a borehole containing an electrically non-conductive fluid comprising:

a pad mounted electrode system including a plurality of points around the borehole wall at each depth level as the apparatus traverses the borehole each said electrode systems having at least one current emitting electrode and at least one current return electrode;

means for producing a high frequency electrical signal;

means for coupling said high frequency electrical signal to said electrode including a variable impedance element, the frequency of said high frequency signal being sufficiently high to couple said electrodes to said formation to permit current to be emitted into the formation surrounding the borehole;

means for comparing the resistive and reactive components of the high frequency signal to produce a plurality of first signals dependent upon the phase difference between the resistive and reactive components thereof;

means for applying said first signals to said variable impedance elements to compensate each of said coupling means for changes in a component of said high frequency electrical signal; and means for measuring at least one component of said high frequency electrical signal to produce an output signal indicative of the resistivity of the earth formation at the various points along the borehole wall for use in determining the dip of the subsurface earth formation at the depth level under investigation.

* * * * *